J. W. Wisner,
Pocket Knife.
N° 35,964.    Patented July 22, 1862.

Witnesses:
J W Coombs.
G W Reed

Inventor:
J. W. Wisner
per Munn & Co
Attorneys.

UNITED STATES PATENT OFFICE.

T. W. WISNER, OF OCEOLA, MICHIGAN.

IMPROVED READY-MARKER.

Specification forming part of Letters Patent No. 35,964, dated July 22, 1862.

*To all whom it may concern:*

Be it known that I, T. W. WISNER, of Oceola, in the county of Livingston and State of Michigan, have invented a new and Improved Ready-Marker; and I do hereby declare that the following is a full, clear, and exact description of the same, reference being had to the accompanying drawings, making a part of this specification, in which—

Figure 1:
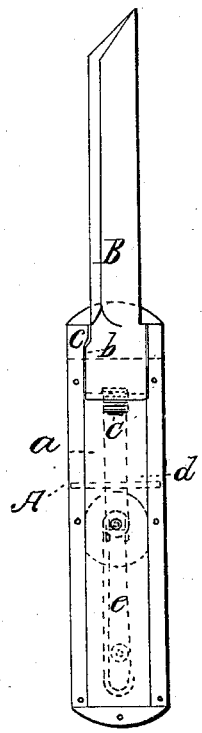
Figure 2:
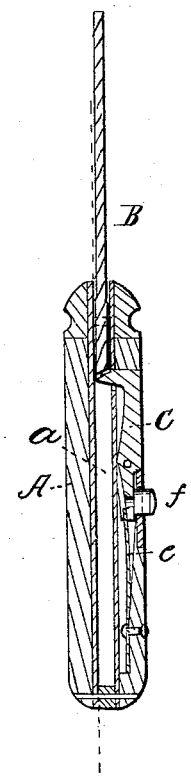

Figure 1 represents a side elevation of my invention, one-half of the handle having been removed to expose the working parts. Fig. 2 is a longitudinal vertical section of the same.

Similar letters of reference in both views denote corresponding parts.

This invention consists in the arrangement of a longitudinally-sliding pointed blade, in combination with a suitable handle and spring-catch, in such a manner that by turning the open end of the handle down and releasing the blade the latter slides out to its working position, in which it is retained by the spring-catch, and by turning the open end of the handle up and releasing the spring catch the blade slides down into the interior of the handle, and is retained in this position by the spring-catch, so that the instrument can be conveniently opened and closed with one hand, and that the same when not used can be conveniently carried in the pocket.

To enable those skilled in the art to make and use my invention, I will proceed to describe it.

The handle A is made of two parts, similar to the handle of an ordinary pocket-knife, and between these two parts a chamber, $a$, is formed, which is closed at one and open at the other end. This chamber receives the blade B, which is provided with a sharp point, and which is made so that it slides readily in said chamber. A small shoulder, $b$, on the back of the knife, by coming in contact with a corresponding shoulder, $c$, in the interior of the chamber $a$, and near to its open end, prevents the blade dropping out of said handle when its open end is turned down. When the blade is inserted between the two parts of the handle, it is retained by a spring-catch, C, which by pressing on its side retains the blade when the same is drawn in, or which catches under its butt-end when the same is drawn out. The spring-catch is inserted into the side of the handle, and it is fulcrated on a small pin, $d$. A spring, $e$, forces the hooked end of the catch in toward the blade, and a button, $f$, which projects slightly beyond the surface of the handle, serves to release the catch. By pressing on this button the hooked end of the catch is raised, and the blade is free to slide in the chamber $a$. It is obvious, however, that the shape of the blade and the construction of the spring catch may be altered at pleasure, and I do not confine myself to the exact form and construction herein shown and described.

This device is particularly intended for carpenters' use, and its principal advantage is that it can be opened and closed with one hand. It can be conveniently carried in the pocket, and whenever it is desired to use it, by turning down the open end of the handle and releasing the spring-catch the blade is brought in its working position, and when done using it the blade can be returned to the interior of the chamber by turning the open end of the handle up and releasing the catch. It is a very simple instrument, which can be used in place of the ordinary pocket-knife, and which can be made at a trifling cost.

Having thus fully described my invention, what I claim as new, and desire to secure by Letters Patent, is—

The longitudinally-sliding blade B, or its equivalent, in combination with the handle A and spring-catch C, constructed and operating substantially as and for the purpose shown and described.

T. W. WISNER.

Witnesses:
 JOHN R. HOLMES,
 JOSEPH BLINSTON.